US012670008B2

(12) United States Patent
Anyapanawar et al.

(10) Patent No.: US 12,670,008 B2
(45) Date of Patent: Jun. 30, 2026

(54) SYSTEM AND METHOD FOR WORKLOAD PORTABILITY IN CLOUD ENVIRONMENTS

(71) Applicant: Datamotive Technologies Private Limited, Pune (IN)

(72) Inventors: Yogesh Anyapanawar, Pune (IN);
Sourav Kumar Patjoshi, Pune (IN);
Rishabh Kemni, Delhi (IN)

(73) Assignee: DATAMOTIVE TECHNOLOGIES PRIVATE LIMITED, Maharashtra (IN)

( * ) Notice: Subject to any disclaimer, the term of this patent is extended or adjusted under 35 U.S.C. 154(b) by 473 days.

(21) Appl. No.: 18/360,247

(22) Filed: Jul. 27, 2023

(65) Prior Publication Data
US 2024/0036912 A1     Feb. 1, 2024

(30) Foreign Application Priority Data

Jul. 28, 2022     (IN) .............................. 202221043162

(51) Int. Cl.
G06F 9/44          (2018.01)
G06F 9/455         (2018.01)
(52) U.S. Cl.
CPC .. G06F 9/45558 (2013.01); G06F 2009/4557 (2013.01); G06F 2009/45595 (2013.01)
(58) Field of Classification Search
CPC ................................................. G06F 9/45558
USPC ........................................................... 718/1
See application file for complete search history.

(56) References Cited

U.S. PATENT DOCUMENTS

| | | | | |
|---|---|---|---|---|
| 9,811,662 B2 * | 11/2017 | Sharpe | .................. | G06F 16/183 |
| 2012/0110237 A1 * | 5/2012 | Li | .......................... | G06F 9/4856 |
| | | | | 711/6 |
| 2016/0048408 A1 * | 2/2016 | Madhu | .................. | H04L 47/783 |
| | | | | 718/1 |
| 2016/0125058 A1 | 5/2016 | Jain et al. | | |
| 2017/0262520 A1 * | 9/2017 | Mitkar | .................. | G06F 16/275 |
| 2022/0091970 A1 | 3/2022 | Han et al. | | |

OTHER PUBLICATIONS

Examination Report received for Indian Application No. 202221043162, mailed on Nov. 30, 2023, pp. 6.

* cited by examiner

*Primary Examiner* — Timothy A Mudrick
(74) *Attorney, Agent, or Firm* — CHIP LAW GROUP

(57) ABSTRACT

A system for facilitating workload portability is provided. The system includes a target server instantiated at a target platform and configured to store, at the target platform, one or more snapshots of a workload executing at a source platform. The snapshots are captured at each defined time-interval and correspond to an incremental change in the workload in raw state. The stored snapshots include boot files and data files. The target server updates, based on a trigger pertaining to workload portability of the workload, the boot files and the data files with configuration supported by the target platform. The target server executes the updated boot files and data files at the target platform. The execution of the workload at the target platform is identical to the execution thereof at the source platform.

20 Claims, 9 Drawing Sheets

100

Start

Store snapshot of workload executing at source platform at target platform — 502

Update boot files and data files with configuration supported by target platform based on trigger pertaining to workload portability of workload — 504

Execute updated boot files and updated data files at target platform — 506

Stop

500

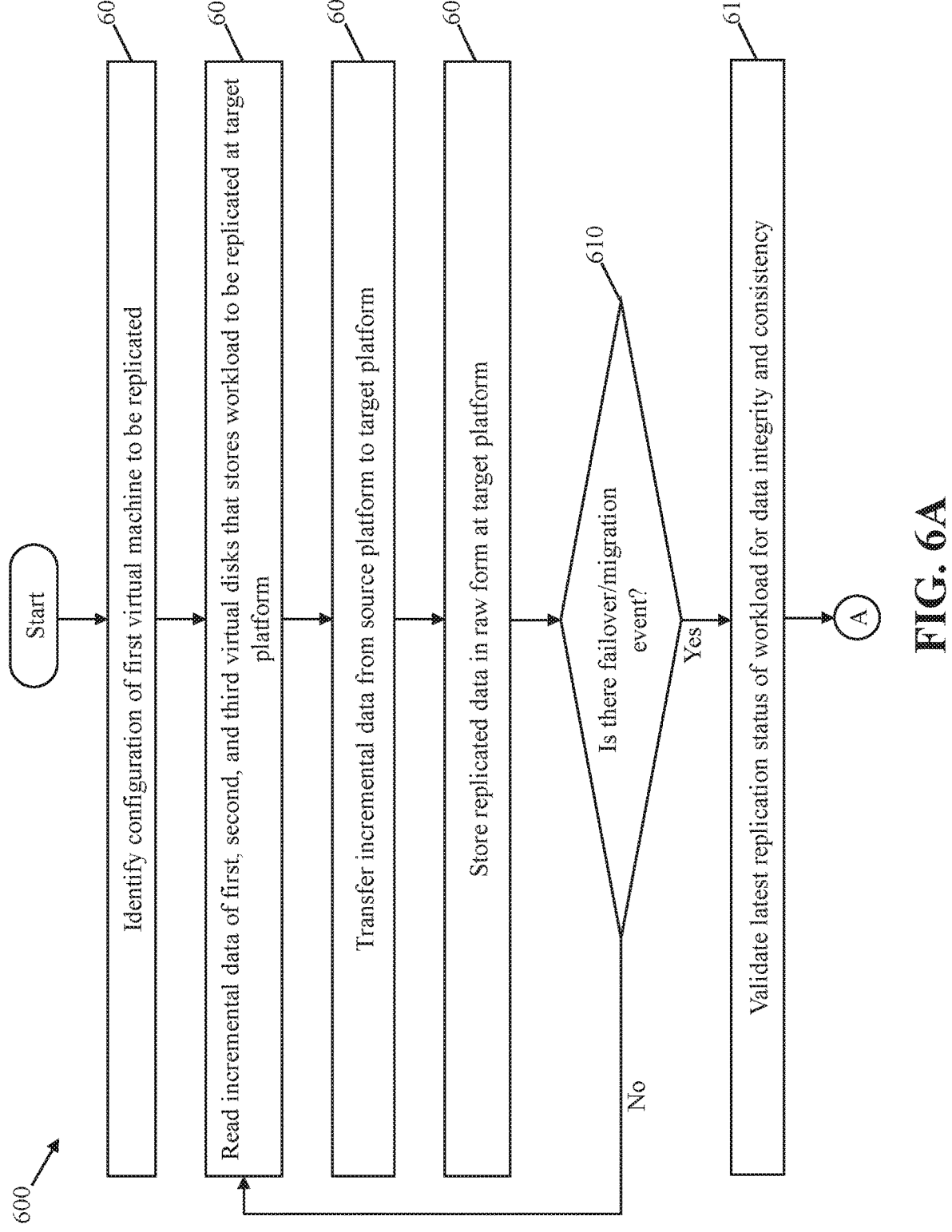

600

Start

Identify configuration of first virtual machine to be replicated          602

Read incremental data of first, second, and third virtual disks that stores workload to be replicated at target platform          604

Transfer incremental data from source platform to target platform          606

Store replicated data in raw form at target platform          608

Is there failover/migration event?          610

No

Yes

Validate latest replication status of workload for data integrity and consistency          612

SYSTEM AND METHOD FOR WORKLOAD PORTABILITY IN CLOUD ENVIRONMENTS

CROSS-RELATED APPLICATIONS

This application claims priority of Indian Provisional Application No. 202221043162 filed Jul. 28, 2022, the contents of which are incorporated herein by reference.

FIELD OF THE DISCLOSURE

Various embodiments of the disclosure relate generally to cloud environments. More specifically, various embodiments of the disclosure relate to methods and systems for workload portability in cloud environments.

BACKGROUND

Cloud service providers (for example, VMware®, Azure®, Amazon web services (AWS®), or the like) have become immensely popular with enterprises as they provide services such as processing capability, storage, software, or the like, in a virtual environment. Such services are beneficial to enterprises in terms of reduced cost, limitless scalability, and improved security. A cloud platform is however susceptible to disasters such as infrastructure failures, security attacks, power outages, or the like, which may result in downtime for the enterprises. Additionally, with advancements in technology and the ever-changing requirements of enterprises, a single cloud platform may not be able to meet all the requirements.

In light of the foregoing, there exists a need for a technical and reliable solution that overcomes the abovementioned problems and ensures efficient switching of cloud platforms.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating workload portability in cloud environments are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIGS. 6A, 6B, and 6C, collectively, illustrate a high-level flowchart that depicts the method for facilitating the workload portability in the cloud environments, in accordance with an embodiment of the disclosure.

DETAILED DESCRIPTION

Figure 1:
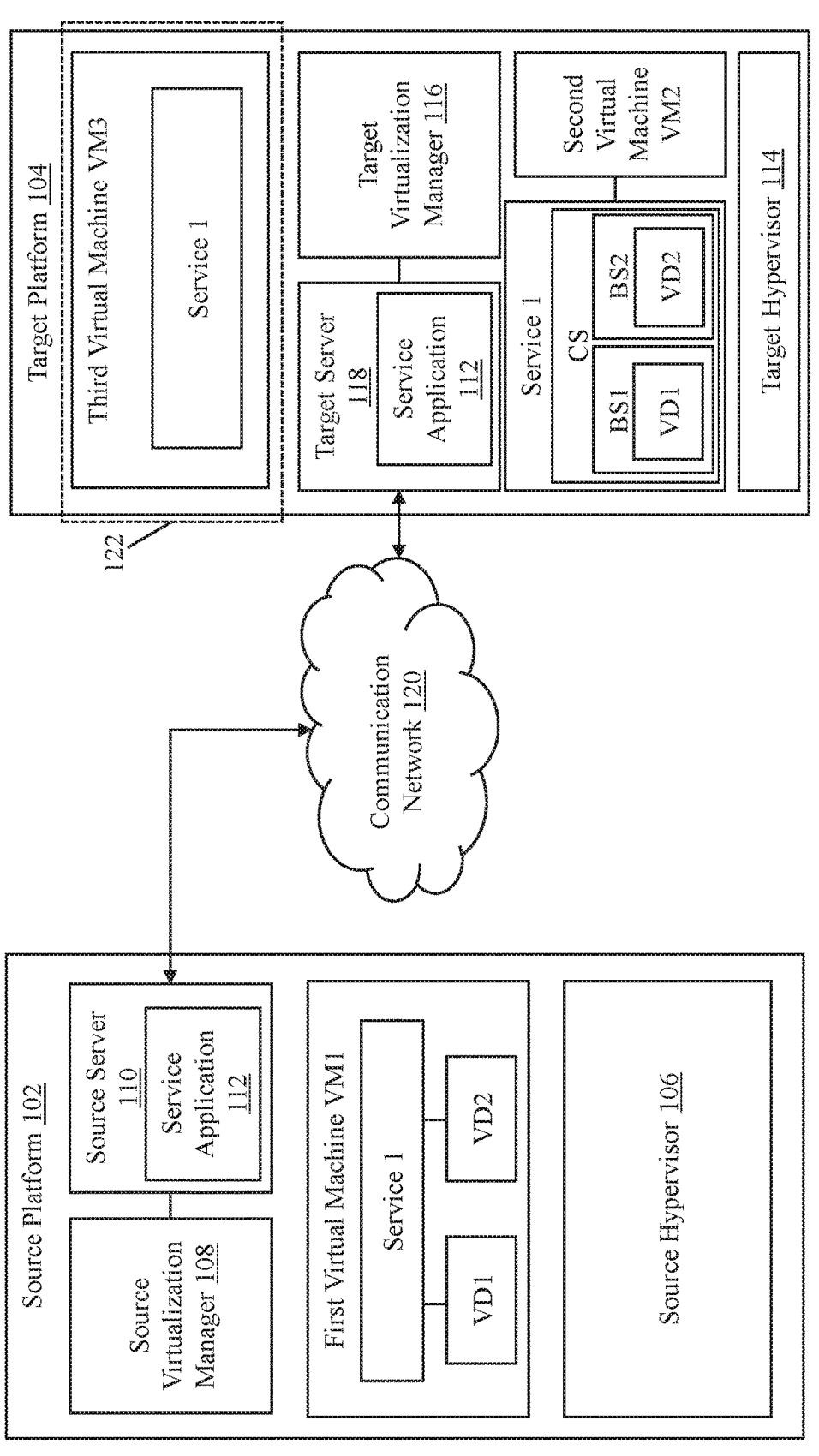
FIG. 1 is a block diagram that illustrates a system environment for facilitating workload portability in cloud environments, in accordance with an embodiment of the disclosure.

Typically, in an event of a disaster at a current cloud platform or an inability of the current cloud platform to meet requirements, enterprises are required to switch from the current cloud platform to a different cloud platform (e.g., from one cloud service provider to another). In such a scenario, workloads (e.g., operating systems, containers, applications running on the operating systems, data associated with such applications, or the like) associated with the current cloud platform are required to be ported to a target cloud platform (e.g., replicated and executed on the target cloud platform).

A known solution for facilitating workload portability may involve converting an image of the workload from a source format to an open virtual format (OVF) and then converting the image from the OVF to a format that is compatible with the target cloud platform. However, such conversions are dependent on a size of the workload, and hence, are time-consuming. Further, the current cloud platform may be required to be shut down to replicate the workload. The resultant downtime may cause significant data loss as well as financial loss to the enterprises.

Certain embodiments of the disclosure may be found in disclosed systems and methods for facilitating workload portability in cloud environments. The disclosed methods and systems may have a source server executing on a source cloud platform. The source server may be configured to determine storage addresses of virtual disks (e.g., a workload) associated with a service currently running at the source cloud platform and to be replicated at a target cloud platform for recovery or migration. The source server may be further configured to capture incremental snapshots of the virtual disks at a defined time-interval. With each snapshot, exclusively incremental/new content on the virtual disks is captured. The source server may be further configured to communicate each snapshot to a target server executing on the target cloud platform. The target server may be configured to store the snapshots in one of block storages, file storages, object storages, or snapshot storages at the target cloud platform in the form of a boot disk and various data disks. The target server may be configured to receive a trigger pertaining to workload portability. In such a scenario, the target server may be further configured to update the boot disk in an offline manner by modifying one or more files in the boot disk that may be required for execution thereof at the target platform. In some embodiments, when the snapshots are not stored in block storages, the snapshots may be moved to one or more block storages before the updating of the boot disk. Similarly, the target server may be configured to update the data disks with the configuration of the target cloud platform. The updated boot and data disks are attached to a virtual machine and subsequently, the virtual machine is executed on the target cloud platform in a manner that is identical to execution on the source cloud platform. The workload is thus ported from the source cloud platform to the target cloud platform.

The methods and systems of the disclosure provide a solution for an accurate and efficient approach for recovering or migrating the workload in cloud environments. The methods and systems disclosed herein provide a simplified and swift solution for recovering or migrating the workload in cloud environments in a significantly reduced period of time. Further, the source cloud platform is not required to be shut down during the replication of the workload.

Figures 2A, 2B:
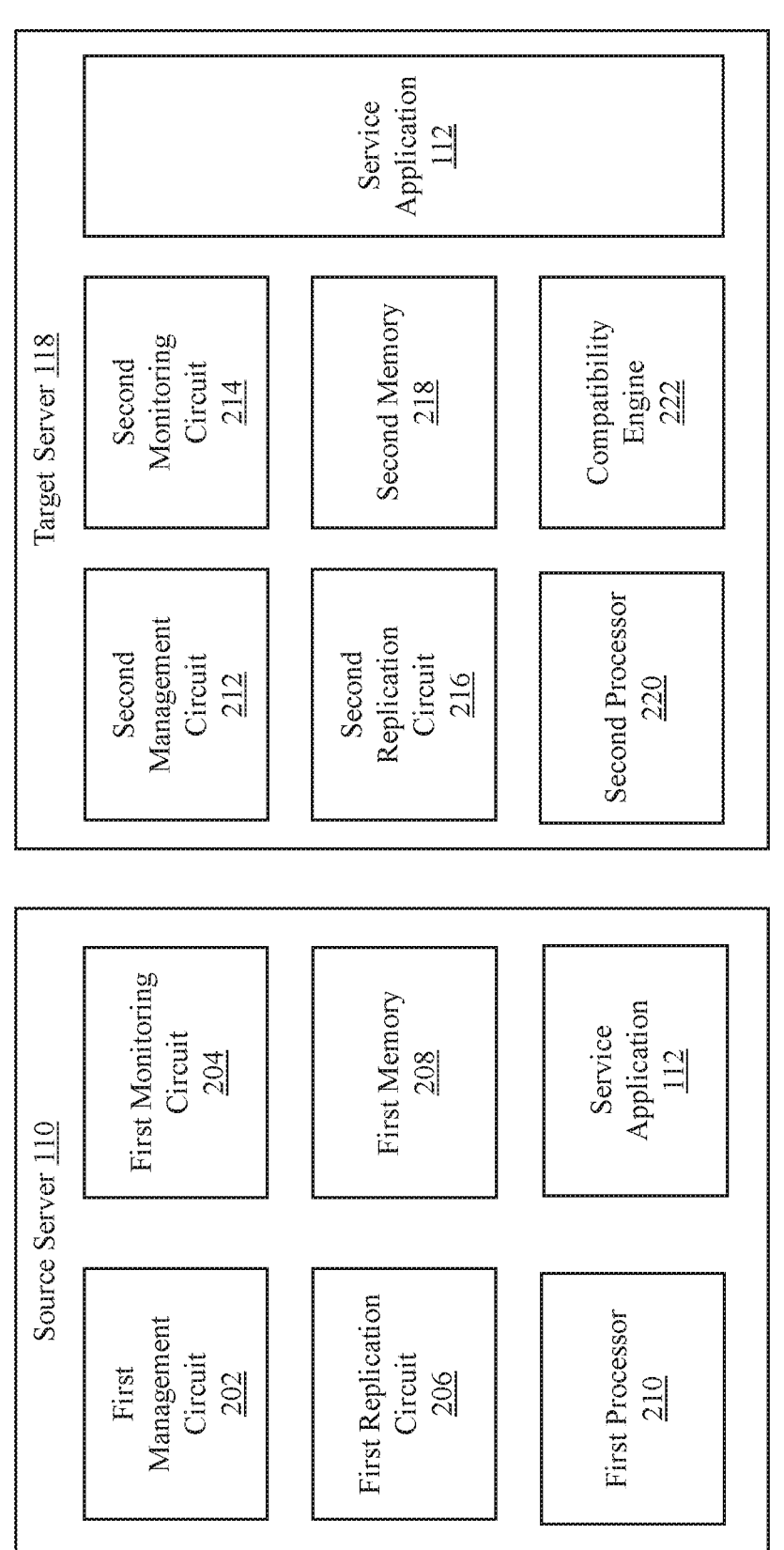
FIGS. 2A and 2B are block diagrams that illustrate a source server and a target server, respectively, of FIG. 1, in accordance with an embodiment of the disclosure.

FIG. 1 is a block diagram that illustrates a system environment 100 for facilitating workload portability in cloud environments, in accordance with an embodiment of the disclosure. Referring to FIG. 1, the system environment 100 includes a source cloud platform 102 and a target cloud platform 104. The source cloud platform 102 and the target cloud platform 104 are hereinafter referred to as the "source platform 102" and the "target platform 104", respectively. A software product (for example, 'Service 1') may be hosted by the source platform 102. Examples of the software product may include a ticketing service, a streaming service, or the like. The source platform 102 may include a source hypervisor 106 and a source virtualization manager 108. Also, a source server 110 having a service application 112 may be instantiated at the source platform 102. Further, as shown in FIG. 1, the target platform 104 includes a target hypervisor 114 and a target virtualization manager 116. A target server 118 is instantiated at the target platform 104. The target server 118 hosts the service application 112. The source and target servers 110 and 118 include various other components which are illustrated in FIGS. 2A and 2B, respectively. The target platform 104 further includes at least one cloud storage (for example, cloud storage CS) that is shown to host a plurality of block storages (for example, a first block storage BS1 and a second block storage BS2). The source server 110 and the target server 118 may communicate via a communication network 120.

The communication network 120 is a medium through which instructions and messages are transmitted between the source server 110 and the target server 118. Examples of the communication network 120 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, microwave communication, and a combination thereof. Examples of the communication network 120 may further include a Narrow Band-Internet of Things (NB-IoT) network, a 5G network, a 4G network, a long-range (LoRa) wireless technology network, a ZigBee network, an IPv6 Low-power Wireless Personal Area Network (6LowPAN), or the like. Various entities (such as the source server 110 and the target server 118) in the system environment 100 may be coupled to the communication network 120 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The source platform 102 may correspond to a cloud platform (for example, VMware®, Azure®, Google Cloud®, Amazon web services (AWS®), a kernel-based virtual machine (KVM), Xen®, or the like) that may provide a wide range of cloud-based services on-demand to users. The source platform 102 provides seamless access to processing capability, storage resources, software features, and the like, provided thereby to the users. The source platform 102 may have one or more software products (for example, the 'Service 1') being hosted thereon. Such services may use infrastructure and features provided by the source platform 102 for execution thereof. Further, the services hosted on the source platform 102 may have one or more virtual machines executing on the source platform 102. In an example, the 'Service 1' may be executing on a first virtual machine VM1 of the source platform 102. Further, the first virtual machine VM1 may have one or more virtual disks associated with the 'Service 1'. The one or more virtual disks may store a workload associated with the 'Service 1' and may include operating systems, applications running on the operating systems, data associated with such applications, or the like. In other words, the one or more virtual disks may include boot files and data files of the workload associated with the 'Service 1'.

The source platform 102 may require periodic updates and may be prone to disasters such as infrastructure failure, power outage, technical failure, security attack, or the like. Hence, the source platform 102 may suffer from occasional downtime which may lead to work-time loss and financial loss to the users of the source platform 102. Therefore, the services hosted on the source platform 102 may require a failover solution to sustain the downtime suffered by the source platform 102. Also, the requirements of the users may change with time and thus the services may also be required to be migrated from the source platform 102 to a different platform (for example, the target platform 104). For the sake of brevity, a single software product (e.g., 'Service 1') is shown to be hosted on the source platform 102. In an actual implementation, multiple software products may be hosted simultaneously on the source platform 102. Further, 'Service 1' is shown to be executing on a single virtual machine (e.g., the first virtual machine VM1) to make the illustrations concise and clear and should not be considered as a limitation of the present disclosure. In various other embodiments, 'Service 1' may execute on multiple virtual machines, without deviating from the scope of the present disclosure.

The source hypervisor 106 creates and executes multiple virtual machines at the source platform 102. In other words, the source hypervisor 106 acts as a virtual machine monitor (VMM) at the source platform 102 and allows the source platform 102 to host multiple virtual machines by virtually sharing resources (for example, storage, processor, peripherals, or the like) and features (for example, a software application). For example, the source hypervisor 106 enables the source platform 102 to host multiple virtual machines in a mutually independent manner. The source hypervisor 106 abstracts underlying infrastructure from the virtual machines and provides a user experience of being the sole user of resources and features. Examples of the source hypervisor 106 may include, but are not limited to, VMware ESXi, Microsoft Hyper-V, Citrix XenServer, VMware Fusion, Oracle virtual box, KVM, and Oracle VM.

The source virtualization manager 108 provides a feature of virtualization management and interfaces with a virtual environment of the source platform 102 to simplify resource administration and streamline operations being executed on the source platform 102. The source virtualization manager 108 may be configured to facilitate provisioning of resources, compliance with security and monitoring systems, authenticating users of the source platform 102, and granting the users access to the source platform 102. Further, the source virtualization manager 108 may be a resource administrator of the source platform 102. The source virtualization manager 108 may be configured to allocate storage locations to virtual machines hosted by the source platform 102. Hence, the source virtualization manager 108 may maintain a log of logical and physical addresses of each virtual machine executing on the source platform 102.

The source server 110 may be a virtual machine executing on the source platform 102. The source server 110 may include suitable logic, circuitry, interfaces, and/or code, executable by the circuitry, configured to facilitate recovery and/or migration of workloads associated with one or more services hosted by the source platform 102. The source server 110 may be configured to communicate with the source virtualization manager 108. The source server 110 may be designed to integrate with different types of hypervisors by aggregating hypervisor-specific information into a single interface. The source server 110 may be realized through various web-based technologies such as, but not limited to, a Java web-framework, a .NET framework, a personal home page (PHP) framework, NodeJS framework, Go Framework, or any other web-application framework.

The source server 110 may be further configured to communicate with the source virtualization manager 108 to query storage locations associated with virtual machines associated with a service that is to be replicated on the target platform 104. Subsequently, the workload of the service may be replicated at the target platform 104 and may be executed on a virtual machine of the target platform 104 in the event of failover or migration. For the sake of brevity, it is assumed that the workload associated with the 'Service 1' is to be replicated on the target platform 104. Therefore, the source server 110 may be configured to query storage locations of the workload associated with the 'Service 1' from the source virtualization manager 108. In other embodiments, other services may also be replicated on the target platform 104.

The source server 110 may be further configured to capture a snapshot of the workload (e.g., the one or more virtual disks associated with the first virtual machine VM1). The source server 110 may use one or more snapshot-capturing techniques supported by the source hypervisor 106 for capturing the snapshot. The snapshot may include raw data associated with the workload of the 'Service 1'. Here, raw data refers to data associated with the 'Service 1' that excludes the configuration (e.g., configuration files) of the source hypervisor 106. The workload associated with the 'Service 1' may include boot files stored on a first virtual disk VD1 associated with the first virtual machine VM1 and data files stored in a second virtual disk VD2 associated with the first virtual machine VM1. Further, the source server 110 may be configured to monitor the first and second virtual disks VD1 and VD2 associated with the first virtual machine VM1 at a defined time-interval to check for a modification (e.g., new addition/increment/deletion of data, virtual machine, or the like) to the one or more virtual disks associated with the 'Service 1'. The defined time-interval may be provided by a user of the source platform 102 who may be an owner of the 'Service 1'. Examples of the defined time-interval may include, but are not limited to, 5 minutes, 10 minutes, 15 minutes, 20 minutes, and so on. A new snapshot of the first and second virtual disks VD1 and VD2 associated with the first virtual machine VM1 may be captured by the source server 110 after every defined time-interval whenever there is a modification to the workload stored in the virtual disks. Notably, for each snapshot, the source server 110 may be configured to capture only a newly modified portion of the first and second virtual disks VD1 and VD2. Accordingly, the source server 110 may be configured to differentiate between an already captured portion of the first and second virtual disks VD1 and VD2 and any newly modified portion of the first and second virtual disks VD1 and VD2. Therefore, each snapshot captured by the source server 110 is unique and does not include duplicate or repeated data associated with the 'Service 1'. In an example, the source server 110 may execute a change block tracking technique to monitor any addition/modification/deletion in the virtual disks.

Further, for each snapshot that the source server 110 captures, the source server 110 may be configured to communicate the snapshot to the target server 118 via the communication network 120. In some embodiments, the snapshots may be communicated in an encrypted form. The source server 110 may be configured to use one or more encryption techniques known in the art for encrypting the snapshots.

The source server 110 may additionally host the service application 112. The service application 112, at the source server 110, may operate in a first mode of operation that may enable the user of the source platform 102 to provide an input to set the defined time-interval for capturing the snapshots. The service application 112 further enables the user to select one or more software products to be ported to the target platform 104. Further, the service application 112, in the first mode of operation, enables the user of the source platform 102 to trigger a recovery or migration event.

The target platform 104 may be functionally similar to the source platform 102, and the target hypervisor 114 may be functionally similar to the source hypervisor 106. However, the target hypervisor 114 may support different configurations, file systems, and drivers as compared to the source hypervisor 106 (e.g., the source platform 102). In a non-limiting example, the source platform 102 corresponds to VMware® and the target platform 104 corresponds to AWS®. Thus, the source hypervisor 106 corresponds to VMware vSphere® and the target hypervisor 114 corresponds to AWS Xen®. In such an example, the source platform 102 may store the workload in VMware Virtual Machine Disk File (VMDK) disks and snapshots of the VMDK disks are stored at the target platform 104 as elastic block storage (EBS) disks. Thus, storage of the snapshots at the target platform 104 may be performed in a format that may be compatible with the target platform 104. Further, the target virtualization manager 116 may be functionally similar to the source virtualization manager 108.

The target platform 104 thus operates as a failover platform for the 'Service 1' originally hosted on the source platform 102. The target platform 104 may be configured to store the snapshots of the 'Service 1' communicated by the source server 110 to the target server 118. Further, the 'Service 1' may be executed on the target platform 104 during an event of a disaster such as an infrastructure failure, a security attack, a power outage, or the like at the source platform 102 and/or the 'Service 1' may be migrated to the target platform 104 when a migration event may be triggered.

In some embodiments, data duplication in the captured snapshots may be eliminated by the source server 110 before communicating the snapshots to the target server 118 by executing one or more de-duplication techniques known in the art on the snapshots. Alternatively, upon receiving the captured snapshots from the source server 110, the target server 118 may be configured to execute the one or more de-duplication techniques known in the art on the snapshots. Beneficially, such removal of duplicate data optimizes the replication of the workload.

In some embodiments, before communicating the snapshots to the target server 118, the source server 110 may be further configured to execute one or more compression techniques on the snapshots to reduce storage space required for storing the snapshots on the target platform 104. The snapshots are communicated to target server 118 in a compressed form. Alternatively, upon receiving the captured snapshots from the source server 110, the target server 118 may be configured to execute the one or more compression techniques on the snapshots. The target server 118, in the event of recovery or migration, may apply one or more decompression techniques known in the art on the snapshots in the compressed form to obtain the raw data included in the snapshots in its initial form.

In some embodiments, before communicating the snapshots to the target server 118, the source server 110 may be further configured to execute one or more encryption techniques on the snapshots. The snapshots are thus communicated to target server 118 in an encrypted form. In such embodiments, the target server 118 may be configured to execute one or more decryption techniques known in the art on the snapshots received in the encrypted form to obtain the raw data captured in the snapshot. The one or more decryption techniques executed for decrypting the encrypted snapshots may be in conformity with the one or more encryption techniques executed for encrypting the snapshots.

In some embodiments, when the source server 110 may not be instantiated at the source platform 102, the target server 118 may be configured to perform a PULL operation to retrieve the snapshots from the source platform 102. In such embodiments, one or more operations being performed by the source server 110 while executing at the source platform 102 may be performed by the target server 118. Further, in such embodiments, the service application 112, while executing on the target platform 104 in a second mode of operation, may also provide features associated with the first mode of operation.

The target server 118 may be configured to communicate one or more instructions to the target virtualization manager 116 in response to which the target virtualization manager 116 may provision one or more block storages (for example, the first block storage BS1 and the second block storage BS2) for storing the snapshots associated with 'Service 1'. The target virtualization manager 116 may be configured to store snapshots associated with the workload of the 'Service 1' separately. Further, when a subsequent snapshot including increments associated with the workload of the 'Service 1' may be received by the target server 118, the target virtualization manager 116 may be configured to store the subsequent snapshot such that raw data included in the subsequent snapshot gets patched up at corresponding storage location associated with a previously received snapshot that may be related to the subsequent snapshot.

In an instance, the failover or migration event may get triggered via the service application 112 hosted on the target server 118. The service application 112 hosted on the target server 118 may operate in the second mode of operation that enables the owner of 'Service 1' to initiate the failover or migration event. Alternatively, the failover or migration event may be triggered via the service application 112 hosted on the source server 110 and operating in the first mode of operation. In such a scenario, the source server 110 may communicate one or more instructions to the target server 118 to initiate recovery or migration of the 'Service 1' on the target platform 104.

Based on the trigger for initiating the failover or migration event, the target server 118 may be configured to attach the first and second block storages BS1 and BS2 having the snapshots of first and second virtual disks VD1 and VD2 associated with the 'Service 1' to a second virtual machine VM2 (for example, a temporary virtual machine) hosted at the target platform 104. The second virtual machine VM2 may be compatible with the configurations of the first virtual machine VM1. Notably, the first block storage BS1 may store boot files, i.e., the snapshot of the first virtual disk VD1 associated with the 'Service 1' and the second block storage BS2 may store data files, i.e., the second virtual disk VD2 associated with the 'Service 1'. That is to say that the boot files associated with the workload are stored separately from the data files associated with the workload. Further, the target server 118 may be configured to update the raw data in the snapshot of the first virtual disk VD1 in an offline manner with configuration (for example, system files, service files, drivers, boot files, network configurations, and display configurations) supported by the target platform 104. The target server 118 may be further configured to update the raw data in the snapshot of the second virtual disk VD2 in an offline manner with configurations of a file system, operating system, or the like supported by the target platform 104. Upon updating the workload associated with the 'Service 1', the target server 118 may be configured to detach the first and second block storages BS1 and BS2 from the second virtual machine VM2. Subsequently, the target server 118 may be configured to communicate one or more instructions to the target virtualization manager 116 to execute the workload (shown within a dotted box 122) having the updated boot and data files associated with the 'Service 1' on a third virtual machine VM3 of the target platform 104. Notably, the 'Service 1' gets executed on the target platform 104 in a manner identical to its execution at the source platform 102. Beneficially, such execution of the 'Service 1' at the target platform 104 may be performed in a significantly reduced amount of time as the workload associated with the 'Service 1' is replicated before the trigger of the failover or migration event. Also, the source platform 102 is not required to be shut down at any point in time during the workload replication.

In operation, the source server 110 may receive a user input for replicating the workload associated with the 'Service 1' at the target platform 104. Based on the received user input, the source server 110 may be configured to communicate incremental snapshots of the virtual disks associated with the 'Service 1' to the target platform 104 after every defined time-interval. The target server 118 may communicate with the target virtualization manager 116 to store the snapshots associated with the workload of the 'Service 1' in the first and second block storages BS1 and BS2. In an instance, when a failover or migration event is triggered, the target server 118 may attach the first and second block storages BS1 and BS2 to the second virtual machine VM2. While the first and second block storages BS1 and BS2 are attached to the second virtual machine VM2, the target server 118 may update the boot files and data files associated with the 'Service 1' with the configuration required for the execution of the 'Service 1' at the target platform 104. Subsequently, the target server 118 may communicate one or more instructions to the target virtualization manager 116 to detach the updated first and second block storages BS1 and BS2 from the second virtual machine VM2. Herein, the term "attach" means the establishment of a physical and/or logical connection between the second virtual machine VM2 and the first and second block storages BS1 and BS2 such that the snapshots stored in the first and second block storages BS1 and BS2 become accessible via the second virtual machine VM2. Herein, "detach" means the elimination of a physical and/or logical connection between the second virtual machine VM2 and the first and second block storages BS1 and BS2 such that the snapshots stored in the first and second block storages BS1 and BS2 become inaccessible via the second virtual machine VM2. The target server 118 may further communicate one or more instructions to the target virtualization manager 116 to execute the updated first and second block storages BS1 and BS2 associated with the 'Service 1' by booting the third virtual machine VM3 of the target platform 104. Upon execution, the 'Service 1' may get deployed (or executed) on the third virtual machine VM3 hosted at the target server 118 in a manner that may be identical to its deployment (or execution) at the source platform 102.

In cases of disaster events, once the source platform 102 is successfully recovered from faults experienced therein, the 'Service 1' may be migrated from the target platform 104 to the source platform 102 in a similar manner as described above. Such migration may be required if the one or more virtual disks associated with 'Service 1' are corrupted during the disaster. Alternatively, if the one or more virtual disks are not corrupted during the disaster, exclusively the incremental workload is replicated from the target platform 104 to the source platform 102 to resume 'Service 1' at the source platform 102.

Although the second virtual machine VM2 is shown to be a part of the target platform 104. In some embodiments, the second virtual machine VM2 may be integral to the target server 118. Although reading and writing operations throughout the description are being performed via the source virtualization manager 108 and/or the target virtualization manager 116. In other embodiments, the reading and writing operations may be performed by the source server 110 and/or the target server 118. It will be apparent to a person of skill in the art that FIG. 1 is exemplary and does not limit the scope of the disclosure.

Although it is shown in FIG. 1 that the cloud storage CS includes block storages i.e., the first and second block storages BS1 and BS2. In other embodiments, the cloud storage CS may include other types of storages such as file storages, object storages, snapshot storages, or the like.

Further, as is shown in FIG. 1, the snapshots are stored in block storages i.e., the first and second block storages BS1 and BS2. In other embodiments, the snapshots may be stored in file storages, object storages, snapshot storages, or a combination thereof. Storage of snapshots in one of block storages (first and second block storages BS1 and BS2), file storages, object storages, or snapshot storages may be based on a preference of an owner of the workload. In some embodiments, when the trigger for failover or migration event is detected, it may be determined that the snapshots are stored in at least one of the file storages, object storages, or snapshot storages. In such embodiments, the snapshots are moved to one of the first and second block storages BS1 and BS2 before updating the boot files and the data files.

FIGS. 2A and 2B are block diagrams that illustrate the source server 110 and the target server 118, respectively, of FIG. 1, in accordance with an embodiment of the disclosure. Referring to FIG. 2A, the source server 110 includes a first management circuit 202, a first monitoring circuit 204, a first replication circuit 206, a first memory 208, and a first processor 210. The source server 110 further includes the service application 112 operating in the first mode of operation. The service application 112 operating in the first mode of operation presents, via a first user interface associated with the source platform 102 or the target platform 104, a first set of user-selectable options for (i) selecting software products that are to be replicated, (ii) selecting the target platform 104 where the workload is to be replicated, (iii) defining the defined time for capturing the incremental snapshots, and (iii) triggering one of the failover event and the migration event.

The first management circuit 202 may include suitable logic, circuitry, interfaces, and/or code, executable by the circuitry, that may be configured to manage communication between the source server 110 and the source virtualization manager 108. The first management circuit 202 may be further configured to manage communication between the source server 110 and the target server 118. Further, the first management circuit 202 may be configured to execute one or more operations associated with user input provided via the service application 112.

The first monitoring circuit 204 may include suitable logic, circuitry, interfaces, and/or code, executable by the circuitry, that may be configured to track updates, modifications, and additions to the workload associated with the 'Service 1'. The first monitoring circuit 204 may be further configured to monitor recent updates i.e., new increments (for example, addition, deletion, modification, or the like) to the workload are captured in the snapshots.

The first replication circuit 206 may include suitable logic, circuitry, interfaces, and/or code, executable by the circuitry, that may be configured to capture the snapshots of the workload associated with the 'Service 1'. The first replication circuit 206 may be configured to communicate with the first management circuit 202 and the first monitoring circuit 204 to receive instructions regarding replication (i.e., capturing of snapshots) of the workload. The first replication circuit 206 may be configured to utilize one or more snapshot-capturing techniques supported by the source hypervisor 106.

The first memory 208 may include suitable logic, circuitry, interfaces, and/or code, executable by the circuitry, that may be configured to store data associated with storage locations of the workload associated with the 'Service 1'. The first memory 208 may be further configured to temporarily store the snapshots associated with the workload. The first memory 208 may be accessible to the first management circuit 202, the first monitoring circuit 204, the first replication circuit 206, and the first processor 210.

The first processor 210 may include suitable logic, circuitry, interfaces, and/or code, executable by the circuitry, that may be configured to perform one or more operations for facilitating the workload portability in the cloud environments. The first processor 210 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), image processors, or the like. It will be apparent to a person of ordinary skill in the art that the first processor 210 may be compatible with multiple operating systems and hypervisors.

In some embodiments, the first processor 210 may be configured to execute one or more de-duplication algorithms to prevent data duplication in the snapshots associated with the 'Service 1'. The first processor 210 may execute source-side de-duplication before transmitting the snapshots to the target server 118. Beneficially, performing de-duplication of data on the snapshots of the virtual disks at source-side allows communication and storage of only a single stance of each data unit included in the snapshots of the workload.

In some embodiments, the first processor 210 may be configured to execute the one or more compression techniques on the snapshots associated with the 'Service 1'. Application of the compression techniques on the snapshots may optimize communication thereof to the target server 118 and storage thereof at the target platform 104. An example of a compression technique may be the lossless compression technique. Beneficially, the lossless compression technique may reduce the size of snapshots of the workload without losing any information present therein. Further, the execution of the lossless compression technique allows the reconstruction of original (i.e., decompressed) data in the workload from a compressed version thereof.

In some embodiments, the first processor 210 may be configured to execute one or more encryption techniques on the snapshots associated with the 'Service 1'. Communicating the snapshots in an encrypted form protects the raw data included in the snapshots from various security threats and attacks. Examples of the encryption techniques may include, but are not limited to, advanced encryption standard (AES), data encryption standard (DES), and international data encryption (IDEA).

Referring to FIG. 2B, the target server 118 may include a second management circuit 212, a second monitoring circuit 214, a second replication circuit 216, a second memory 218, a second processor 220, and a compatibility engine 222. The second management circuit 212 may be functionally similar to the first management circuit 202. The second monitoring circuit 214 may be functionally similar to the first monitoring circuit 204. The second replication circuit 216 may be functionally similar to the first replication circuit 206. The second memory 218 may be functionally similar to the first memory 208. The second processor 220 may be functionally similar to the first processor 210. The target server 118 further includes the service application 112 operating in the second mode of operation. The service application 112 operating in the second mode of operation, presents via a second user interface associated with the target platform 104, a second set of user-selectable options for: (i) selecting a storage type for storing the snapshots (ii) initiating the migration of the workload to back the source platform 102 or any other cloud-based platform. In some embodiments, when the source server 110 may not be instantiated at the source platform 102, the service application 112 operating in the second mode of operation may also present the first set of user-selectable options along with the second set of user-selectable options.

In some embodiments, data de-duplication may not be performed by the source server 110. In such embodiments, the second processor 220 may be configured to perform target-side de-duplication of data by removing duplicate stances of a data unit once the snapshots are received by the target server 118.

In some embodiments, data compression may not be performed by the source server 110. In such embodiments, the second processor 220 may be configured to perform data compression on the snapshots received from the source server 110. The second processor 220, in the event of recovery or migration, may execute one or more decompression techniques known in the art on the compressed snapshots to obtain the raw data included in the snapshots in its initial form. The second processor 220 may be further configured to decrypt the snapshots received from the source server 110 in the encrypted form. The second processor 220 may be further configured to attach/detach the first and second block storages BS1 and BS2 to/from the second virtual machine VM2 and third virtual machine VM3.

The compatibility engine 222 may include suitable logic, circuitry, interfaces, and/or code, executable by the circuitry, that may be configured to act as an interface for preparing the workload to be deployed at the target platform 104 in accordance with the operating system, file system, configurations, parameters, or the like supported by the target platform 104 at which 'Service 1' has to be executed. Though, in FIG. 2B, the compatibility engine 222 is shown to be integral to the target server 118. In other embodiments, the compatibility engine 222 may be executed as a separate virtual machine at the target platform 104.

It will be apparent to a person of skill in the art that the source server 110 and the target server 118 may include one or more additional or different components to perform similar or dissimilar operations associated with the recovery and/or migration of workload in cloud environments.

Figure 3A:
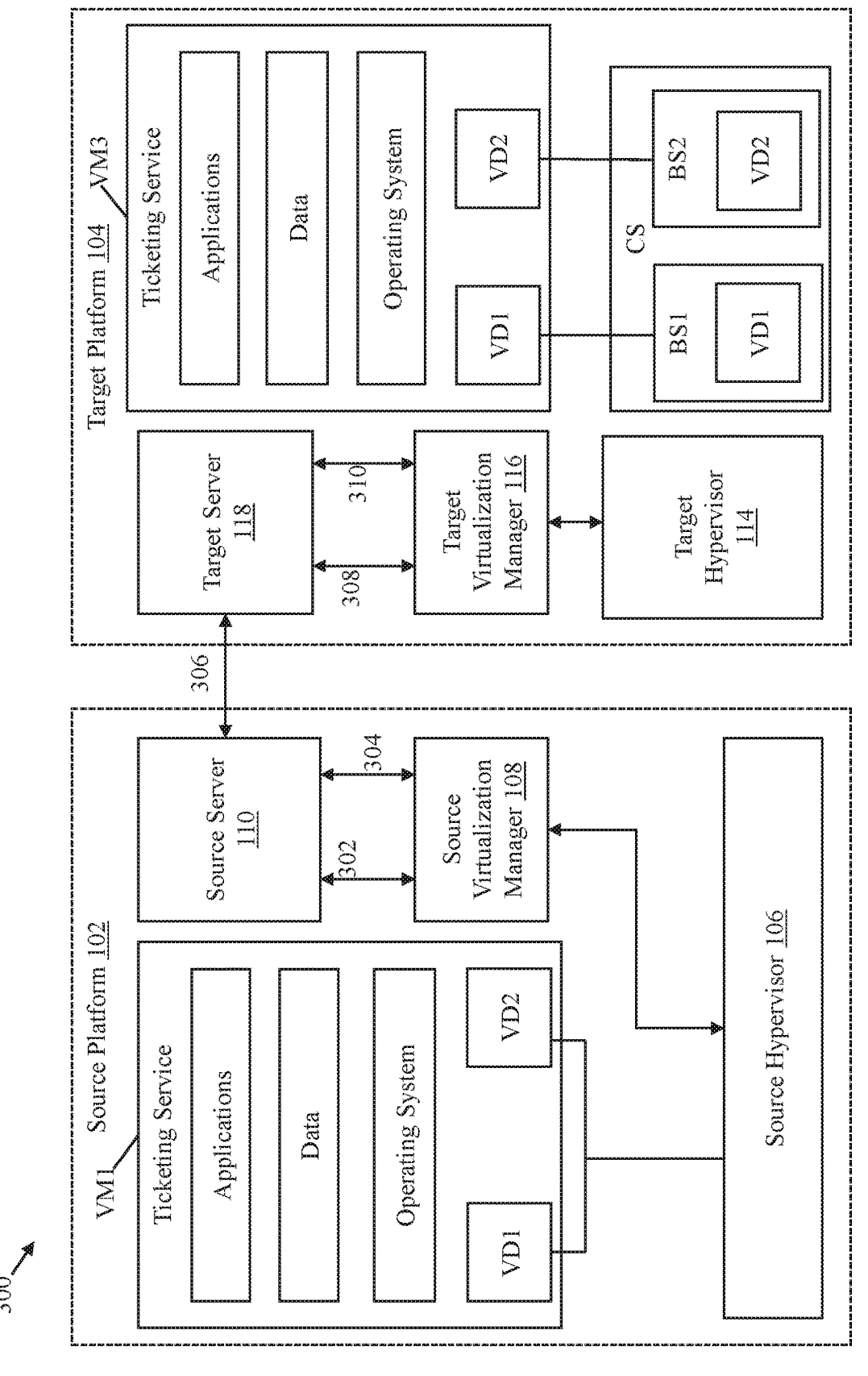
FIG. 3A is a block diagram that illustrates an exemplary implementation of a system for facilitating the workload portability in the cloud environments, in accordance with an embodiment of the disclosure.

FIG. 3A is a block diagram that illustrates an exemplary implementation of the system for facilitating the workload portability in the cloud environments, in accordance with an embodiment of the disclosure. As shown in FIG. 3A, the source platform 102 may have the first virtual machine VM1 that may host a software product 'Ticketing service'. As shown, the first virtual machine VM1 may have first and second virtual disks VD1 and VD2 that may be boot disks and/or data disks associated with the software product 'Ticketing Service'. The source server 110 may receive a first user input for replicating the workload associated with the software product 'Ticketing Service' at the target platform 104 for having a backup in the event of failure at the source platform 102 or to be used for migrating the software product 'Ticketing Service' from the source platform 102 to the target platform 104 in an event of migration.

Based on the first user input, at 302, the source server 110 may determine the configuration of the first virtual machine VM1 that hosts the workload associated with the software product 'Ticketing Service' to be replicated at the target platform 104. Configurations of a virtual machine (e.g., the first virtual machine VM1) may include, but are not limited to, an identifier of the virtual machine, a count of central processing units (CPUs) supported by the virtual machine, an operating system executing on the virtual machine, a size of random access memory (RAM) allocated to the virtual machine, a count of network interfaces card associated with the virtual machine, a firmware type (e.g., basic input/output system (BIOS), unified extensible firmware interface (UEFI), or the like) of the virtual machine, and a count and size of virtual disks associated with the virtual machine. In some embodiments, the configuration of the first virtual machine VM1 may be based on X86 architecture or Advanced RISC Machine (ARM) architecture. In other embodiments, the configuration of the first virtual machine VM1 may be based on some other computer processor architecture. The source server 110 may communicate with the source virtualization manager 108 to determine the configuration and parameters associated with the first virtual machine VM1. In some embodiments, the source server 110 may be further configured to acquire a storage address associated with the first and second virtual disks VD1 and VD2 from the source virtualization manager 108.

Further, at 304, based on the determined configuration, the source server 110 may acquire a snapshot of the first and second virtual disks VD1 and VD2. In some embodiments, when the source server 110 has the storage addresses of the first and second virtual disks VD1 and VD2, the source server 110 may independently capture the snapshots of the first and second virtual disks VD1 and VD2. In some embodiments, when the source server 110 may not have the storage addresses of the first and second virtual disks VD1 and VD2, the source server 110 may capture the snapshots of the first and second virtual disks VD1 and VD2 via the source virtualization manager 108. An example of snapshot capturing techniques may be VMware snapshot. A step-by-step description for capturing incremental snapshots of the first and second virtual disks VD1 and VD2 is described in conjunction with FIG. 3B.

In some embodiments, the source server 110 may be configured to execute at least one of the de-duplication techniques, the compression techniques, and the encryption techniques on the snapshots of the first and second virtual disks VD1 and VD2. Further, at 306, the source server 110 may communicate the snapshots of the first and second virtual disks VD1 and VD2 to the target server 118 of the target platform 104. Notably, the snapshots include boot files and data files stored in the first and second virtual disks VD1 and VD2 in a raw format that is without configuration associated with the source hypervisor 106 of the source platform 102.

Further, at 308, the target server 118 may be configured to communicate one or more instructions to the target virtualization manager 116 to store the snapshots of the first and second virtual disks VD1 and VD2 in a mapped virtual disk that may be of adequate size or in an equivalent block storage representation on the target platform 104. The first virtual disk VD1 may include boot files associated with the software product 'Ticketing Service' and a snapshot of the first virtual disk VD1 may be stored in the first block storage BS1. The second virtual disk VD2 may include data files associated with the software product 'Ticketing Service' and snapshots of the second virtual disk VD2 may be stored in the second block storage BS2. In some embodiments, the target server 118 may be configured to determine the authenticity of the snapshots upon reception thereof at the target platform 104. The target server 118 alone or in conjunction with the source server 110 may be configured to determine the authenticity of the snapshots by way of applying one or more error detection techniques (for example, the checksum method).

In the event of recovery or migration, a trigger to execute the workload associated with the software product 'Ticketing Service' at the target platform 104 may be received by the target server 118. Based on the reception of the trigger, the target server 118 may be configured to validate a replication status for data integrity and consistency associated with the snapshots stored in the first block storage BS1 and the second block storage BS2. That is to say that, the target server 118 may validate the raw data, in the form of the most recent snapshots, stored in the first block storage BS1 and the second block storage BS2, to determine the usability thereof for executing the software product 'Ticketing Service' at the target platform 104. Further, validating the replication status also determines whether there has been any damage or discrepancy caused to the snapshots that may require any repair. In an event when one or more repairable damages are found to be caused to the snapshots, the target server 118 may perform one or more operations to repair the snapshots to obtain the snapshots in a state that may be used to execute the software product 'Ticketing Service' at the target platform 104.

Subsequently, the target server 118 may determine the configuration (for example, drivers, file system, or the like) supported by the target platform 104. The configuration may have to be updated on the raw data associated with the software product 'Ticketing Service' to execute the software product 'Ticketing Service' at the target platform 104. Further, at 310, the target server 118 may attach (for example, connect) the first block storage BS1 and the second block storage BS2 to the second virtual machine (for example, the second virtual machine VM2 shown in FIG. 1) hosted at the target platform 104 by communicating one or more instructions to the target virtualization manager 116 or independently. The second virtual machine VM2 may be compatible with the configurations of the first virtual machine VM1. The second virtual machine VM2 may have an operating system that may be supported by the target hypervisor 114. Further, the target server 118 may update, via the target virtualization manager 116 or independently, the raw data included in the snapshot of the first virtual disk VD1 stored in the first block storage BS1 by including drivers supported by the target platform 104. The target server 118 may further update raw data included in the snapshot of the second virtual disk VD2 stored in the second block storage BS2 with configuration supported by the target platform 104. In an example, the configuration supported by the target platform 104 may include file system configurations of the operating system supported by the target hypervisor 114. Though the ongoing description is described to update the raw data in snapshots of the first and second virtual disks VD1 and VD2 by installing drivers and configurations supported by the target platform 104, in some embodiments, the target server 118 may remove one or more drivers or configurations from the snapshots of the first and second virtual disks VD1 and VD2 to update the snapshots of the first and second virtual disks VD1 and VD2.

The target server 118 may be further configured to detach (for example, disconnect) the first block storage BS1 and second block storage BS2 from the second virtual machine (for example the second virtual machine VM2 shown in FIG. 1) by communicating one or more instructions to the target virtualization manager 116 or independently. Subsequently, the target server 118 may be configured to attach the first block storage BS1 including the updated snapshots of the first virtual disk VD1, and the second block storage BS2 including the updated snapshots of the second virtual disk VD2 to the third virtual machine VM3 of the target platform 104.

In some embodiments, the target server 118 may receive a second user input for updating network security and access control configurations (for example, permissions, restrictions, or the like) associated with the third virtual machine VM3. The second user input may be provided by the owner of the software product 'Ticketing Service'. The second user input may replicate the network security and access control configurations associated with the first virtual machine VM1 of the source platform 102 on the third virtual machine VM3 of the target platform 104. Subsequently, the target server 118 may boot the third virtual machine VM3 having the first and second virtual disks VD1 and VD2 associated with the software product 'Ticketing Service' and updated with the configuration supported by the target hypervisor 114 of the target platform 104.

Beneficially, since the first and second virtual disks VD1 and VD2 have been replicated incrementally at regular intervals. Therefore, in the event of recovery or migration of the software product 'Ticketing Service' may be performed in a significantly reduced amount of time (for example, within 10 minutes). Notably, recovering or migrating the software product 'Ticketing Service' may only require updating the raw data included in the snapshots with the configuration supported by the target platform 104.

In some embodiments, the source platform 102 may recover from the disaster and may be ready to execute the software product 'Ticketing Service'. In such embodiments, the abovementioned operations may be performed in a reverse order that is reverse replication of the first and second virtual disks VD1 and VD2 from the target platform 104 to the source platform 102. In some embodiments, when the first and second virtual disks VD1 and VD2 at the source platform 102 remain unaffected by the disaster caused to the source platform 102. In such embodiments, only new additions to the first and second virtual disks VD1 and VD2 at the target platform 104 that are not stored in the first and second virtual disks VD1 and VD2 at the source platform 102 get replicated at the source platform 102.

In some embodiments, one or more operations for recovery or migration of the workload in cloud environments may be customized/modified in accordance with an operating system (for example, Windows operating system, Linux operating system, or the like) supported by the first virtual machine VM1 of the source platform 102.

Figure 3B:
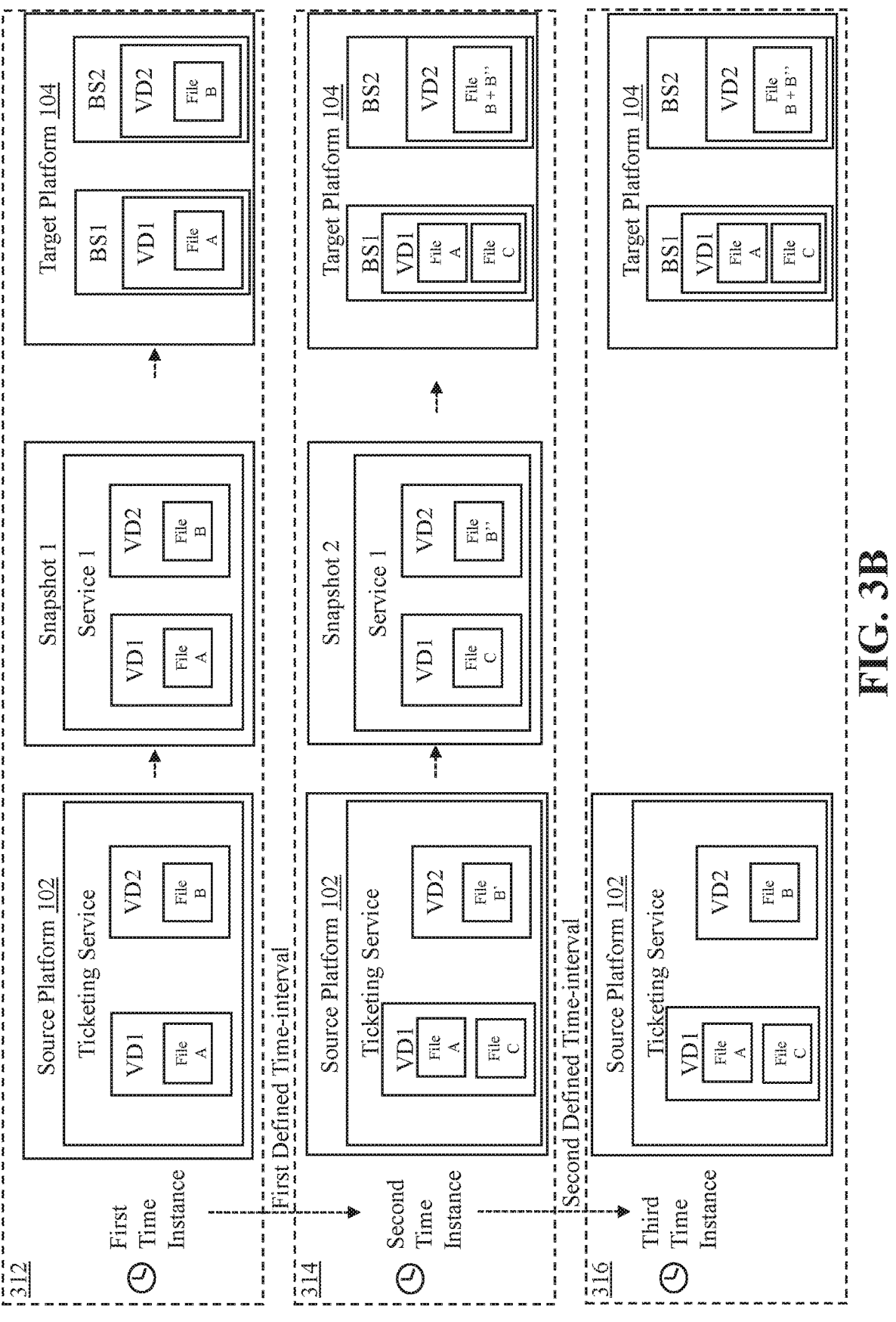
FIG. 3B is a block diagram that illustrates an exemplary environment for capturing snapshots of a workload to be ported, in accordance with an embodiment of the disclosure.

FIG. 3B is a block diagram that illustrates an exemplary environment for capturing snapshots of the workload to be ported, in accordance with an embodiment of the disclosure. Referring to FIG. 3B, shown are states of the first and second virtual disks VD1 and VD2 associated with the software product 'Ticketing Service' at a first time instance, a second time instance, and a third time instance. The first time instance may be a point in time when a first snapshot of the workload associated with the software product 'Ticketing Service' may be captured. The second time instance may be a point in time when a second snapshot of the workload associated with the software product 'Ticketing Service' may be captured once the defined time-interval has passed after the first time instance. The third time instance may be a point in time when a third snapshot of the workload associated with the software application 'Ticketing Service' may be captured once the defined time-interval has passed after the second time instance.

As shown within a dotted box 312, at the first time instance, the workload associated with the software application 'Ticketing Service' may be stored in the first and second virtual disks VD1 and VD2. The first virtual disk VD1 may include a file A and the second virtual disk VD2 may include a file B. At the first time interval, none of the first and second virtual disks VD1 and VD2 have been replicated at the target platform 104. Therefore, a snapshot including each of the first and second virtual disks VD1 and VD2 having the files A and B, respectively, are captured and communicated to the target platform 104 to be stored in block storages (for example, the first block storage BS1 and the second block storage BS2).

As shown within another dotted box 314, at the second time instance, the workload associated with the software product 'Ticketing Service' may be stored in the first and second virtual disks VD1 and VD2. The first virtual disk VD1 may include the file A and a newly added file C, and the second virtual disk VD2 may include the file B' that is file B that has been modified to add or delete data associated with the software product 'Ticketing Service'. The source server 110 may determine that the files A and B are already captured and the file C has been newly added. The source server 110 may further determine that a section of the file B that has been modified during a first defined time-interval between the first time instance and the second time instance has not been captured. The modified section of the file B is in a file B". Therefore, as shown, the file C in the first virtual disk VD1 and the modified section of the file B are considered incremental data i.e., updated data. Hence, a snapshot of the incremental data i.e., the file C and the modified section of the file B i.e., the file B" may be captured and communicated to the target server 118. At the target platform 104, the target server 118 may determine that the file C belongs to the first virtual disk VD1. Hence, the target server 118 may patch a first portion of the snapshot including the file C at the corresponding location in the first block storage BS1 that includes the first virtual disk VD1. The target server 118 may further determine that the modified section of the file B i.e., the file B" is to be patched with an existing snapshot of the file B. Hence, the target server 118 may patch a second portion of the snapshot including the modified section of the file B in the second virtual disk VD2 such that the patched snapshot is stored at its corresponding location that is in conformity with the existing snapshot of the file B. Hence, a file B+B" include contents of the file B'. Throughout the description, the terms 'updated data', 'newly added data', and 'incremental data' are used interchangeably.

As shown within another dotted box 316, at the third time instance, the workload associated with the software product 'Ticketing Service' may be stored in the first and second virtual disks VD1 and VD2. The first virtual disk VD1 may include the file A and the file C and the second virtual disk VD2 may include the file B+B". The source server 110 may determine that there is no incremental data or addition in any of the first and second virtual disks VD1 and VD2 during a second defined time-interval between the second time instance and the third time instance. Hence, in the third time instance, no new snapshot may be captured.

Although the cloud storage CS is not shown in FIG. 3B, it will be apparent to a person skilled in the art that the cloud storage CS is hosted on the target platform 104 and includes the first and second block storages BS1 and BS2. It will be apparent to a person of skill in the art that FIG. 3B is exemplary and does not limit the scope of the disclosure.

Figure 4:
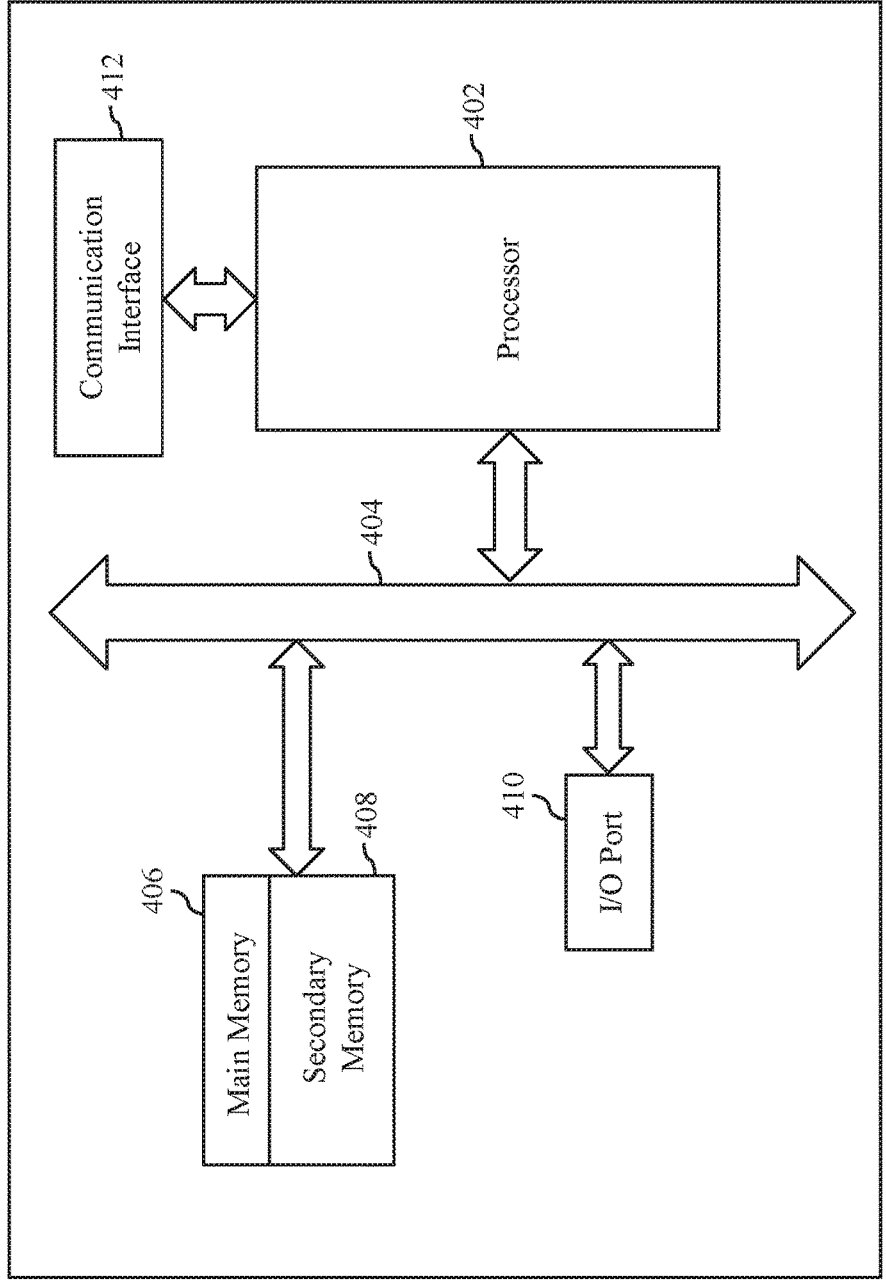
FIG. 4 is a block diagram that illustrates a system application of a computer system for facilitating the workload portability in the cloud environments, in accordance with an embodiment of the disclosure.
Figure 4:

FIG. 4 is a block diagram that illustrates a system application of a computer system 400 for facilitating the workload portability in the cloud environments, in accordance with an embodiment of the disclosure. An embodiment of the disclosure, or portions thereof, may be implemented as computer-readable code on the computer system 400. In one example, the source server 110 or the target server 118 of FIG. 1 may be implemented in the computer system 400 using hardware, software, firmware, non-transitory computer-readable media having instructions stored thereon, or a combination thereof and may be implemented in one or more computer systems or other processing systems. Hardware, software, or any combination thereof may embody modules and components used to implement the method of FIGS. 5 & 6A-6C.

The computer system 400 may include a processor 402 that may be a special-purpose or a general-purpose processing device. The processor 402 may be a single processor or multiple processors. The processor 402 may have one or more processor cores. Further, the processor 402 may be coupled to a communication infrastructure 404, such as a bus, a bridge, a message queue, the communication network 120, a multi-core message-passing scheme, or the like. The computer system 400 may further include a main memory 406 and a secondary memory 408. Examples of the main memory 406 may include random-access memory (RAM), a read-only memory (ROM), or the like. The secondary memory 408 may include a hard disk drive or a removable storage drive, such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer-readable recording media.

The computer system 400 may further include an input/ output (I/O) port 410 and a communication interface 412. The I/O port 410 may include various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may be configured to allow data to be transferred between the computer system 400 and various devices that are communicatively coupled to the computer system 400. Examples of the communication interface 412 may include a modem, a network interface, i.e., an Ethernet card, a communication port, and the like. Data transferred via the communication interface 412 may be signals, such as electronic, electromagnetic, optical, or other signals as will be apparent to a person skilled in the art. The signals may travel via a communications channel, such as the communication network 120, which may be configured to transmit the signals to the various devices that are communicatively coupled to the computer system 400. Examples of the communication channel may include a wired, wireless, and/or optical media such as cable, fiber optics, a phone line, a cellular phone link, a radio frequency link, and the like. The main memory 406 and the secondary memory 408 may refer to non-transitory computer-readable mediums that may provide data that enables the computer system 400 to implement the method illustrated in FIGS. 5 and 6A-6C.

Figure 5:
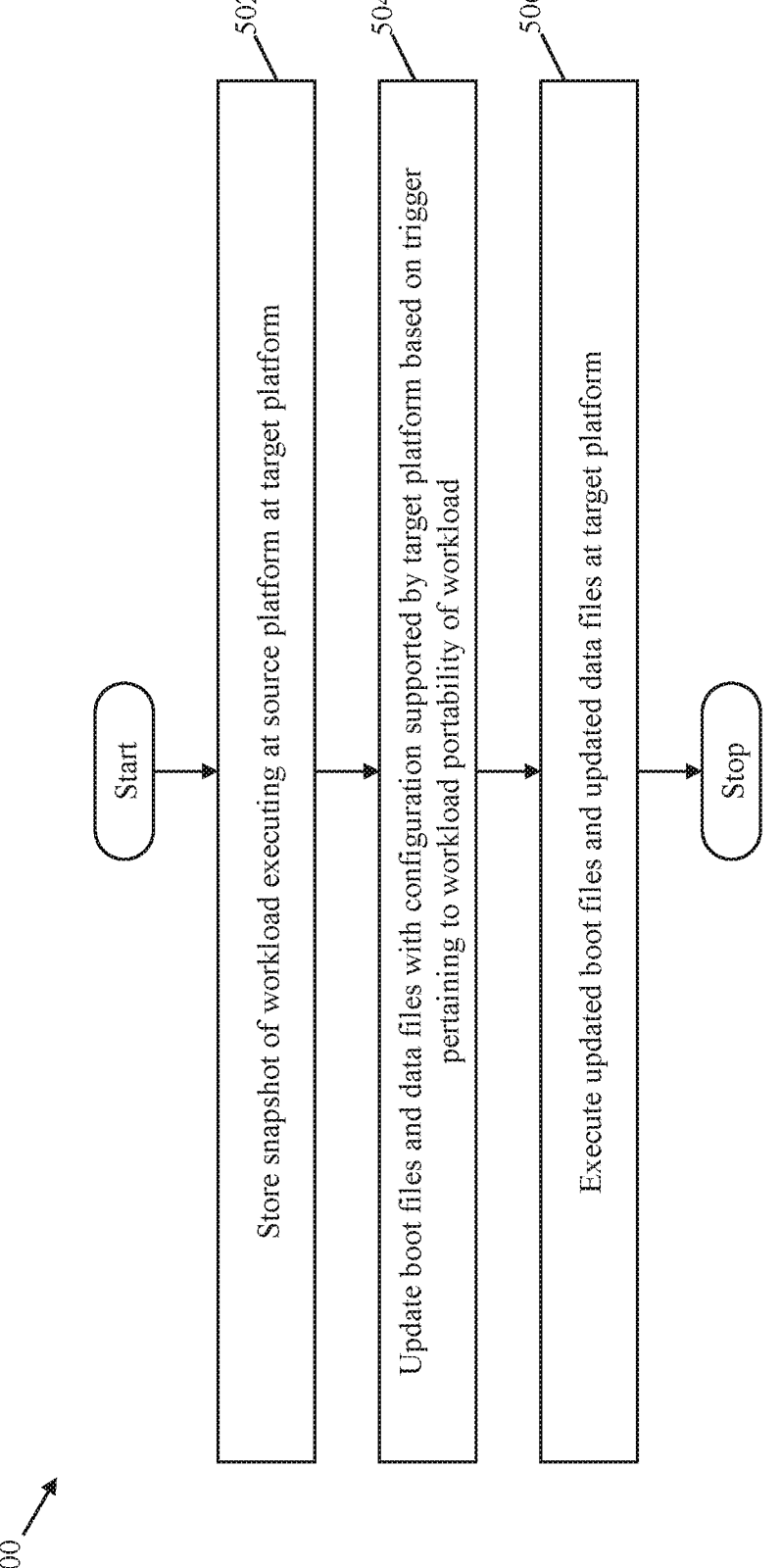
FIG. 5 is a flowchart that illustrates a method for facilitating the workload portability in the cloud environments, in accordance with an embodiment of the disclosure.

FIG. 5 is a flowchart 500 that illustrates a method for facilitating the workload portability in the cloud environments, in accordance with an embodiment of the disclosure. Referring to FIG. 5, at 502, the snapshot of the workload executing at the source platform 102 is stored at the target platform 104. The target server 118 is configured to store, at the target platform 104, the snapshot of the workload executing at the source platform 102. The snapshot is captured at each defined time-interval and corresponds to the incremental change in the workload in raw state. The workload stored at the target platform 104 includes one or more boot files and one or more data files.

At 504, the one or more boot files and the one or more data files are updated based on the trigger pertaining to the workload portability of the workload. The target server 118 is configured to update, based on the trigger pertaining to workload portability of the workload, the one or more boot files and the one or more data files with configuration supported by the target platform 104.

At 506, the updated one or more boot files and the updated one or more data files are executed at the target platform 104. The target server 118 is configured to execute the updated one or more boot files and the updated one or more data files at the target platform 104. The execution of the workload at the target platform 104 is identical to the execution thereof at the source platform 102.

Figure 6B:
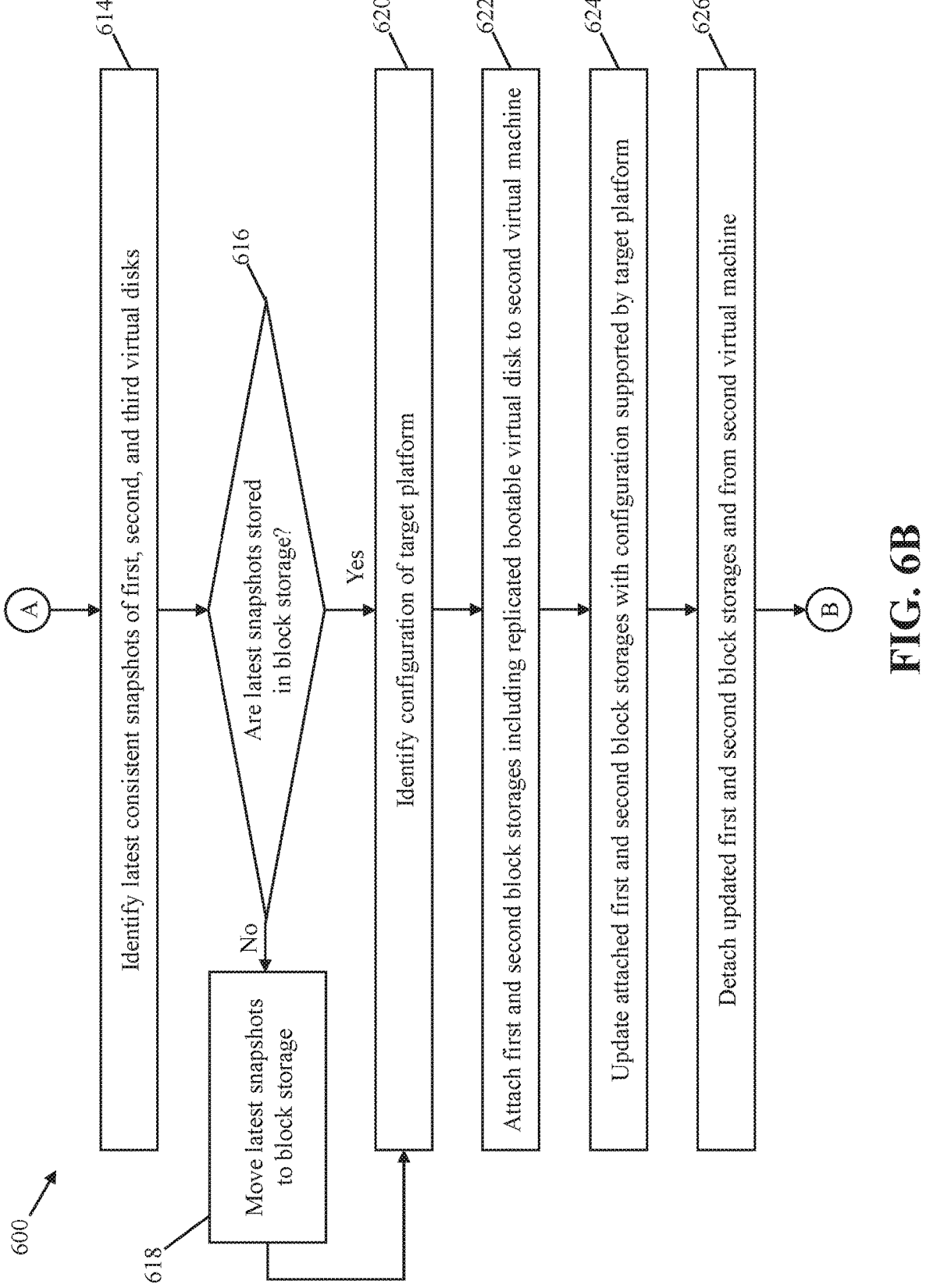
Figure 6C:
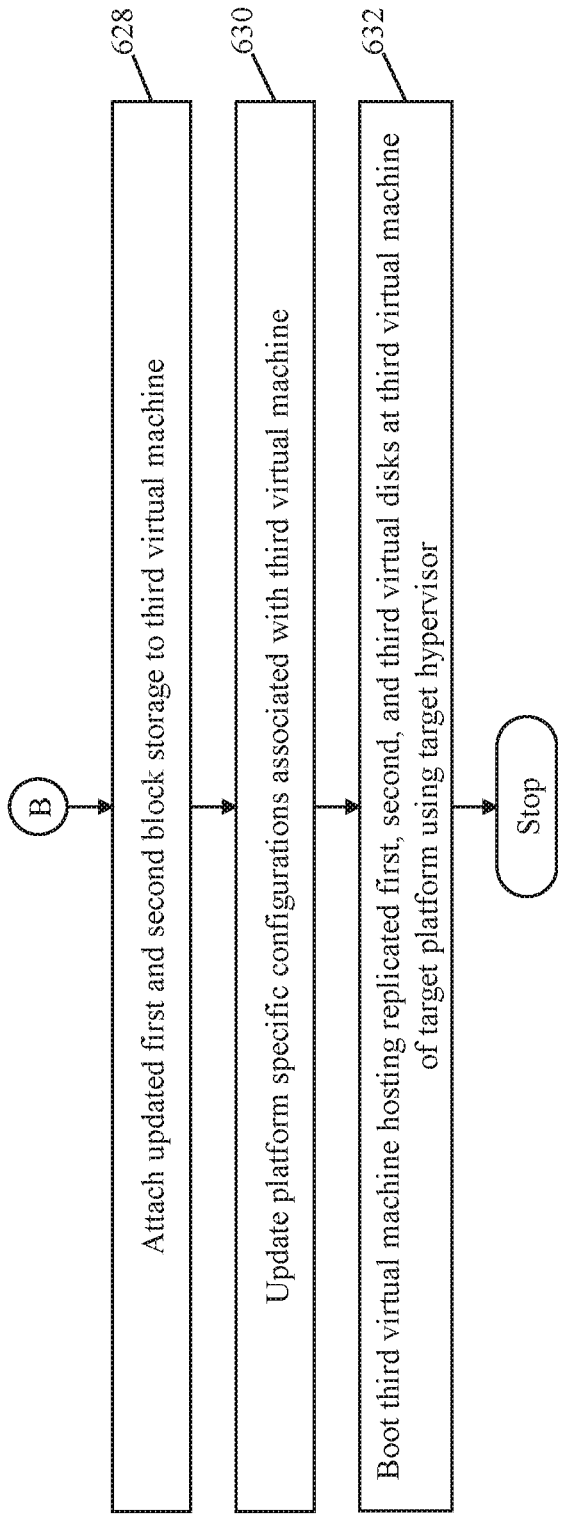

FIGS. 6A, 6B, and 6C, collectively, illustrate a high-level flowchart 600 that depicts the method for facilitating the workload portability in the cloud environments, in accordance with an embodiment of the disclosure.

Referring to FIG. 6A, at 602, the configuration of the first virtual machine VM1 to be replicated is identified. The source server 110 may be configured to identify the configuration of the first virtual machine VM1 hosted on the source platform 102 and that is to be replicated at the target platform 104 based on the first user input received via the service application 112 operating in the first mode of operation.

At 604, the incremental data of the first and second virtual disks VD1 and VD2 that stores the workload, to be replicated at the target platform 104, are read (i.e., captured). The source server 110 may be configured to read (i.e., capture) the incremental data of the first and second virtual disks VD1 and VD2. The incremental data may refer to data that has not been captured by the source server 110 in any previously captured snapshot.

At 606, the incremental data may be transferred from the source platform 102 to the target platform 104. The source server 110 may be configured to transfer the incremental data from the source platform 102 to the target platform 104 (e.g., the target server 118) in the form of the snapshots.

At 608, the replicated data (i.e., snapshots) in the raw form is stored at the target platform 104. The target server 118 may be configured to store the replicated data in the raw form on the target platform 104 (e.g., the first and second block storages BS1 and BS2).

At 610, it is determined whether a failover or a migration event has been triggered. The source server 110 or the target server 118 may be configured to determine whether a failover or a migration event has occurred. At 610, when an occurrence of the failover or the migration event is not detected by the source server 110, 604 may be executed. At 610, when the occurrence of the failover or the migration event is detected, 612 may be executed.

At 612, the latest replication status of the workload may be validated for data integrity and consistency. The target server 118 may be configured to validate (i.e., authenticate) the latest replication status of the workload, stored in the first and second virtual disks VD1 and VD2, for data integrity and consistency. The latest replication status of the workload may be validated by determining a checksum of the snapshots.

Referring now to FIG. 6B, at 614, the latest consistent snapshots of the first and second virtual disks VD1 and VD2 are identified. The target server 118 may be configured to identify the latest consistent snapshots of the first and second virtual disks VD1 and VD2 to be ported to the target platform 104.

At 616, it is determined whether the latest consistent snapshots are stored in block storage. In an instance, when it is determined that the latest consistent snapshots are not stored in any of the first and second block storages BS1 and BS2, 618 is executed. At 618, the latest consistent snapshots are moved to at least one of the first and second block storages BS1 and BS2. Subsequently, 620 is executed. In another instance, when it is determined that the latest consistent snapshots are stored in one of the first and second block storages BS1 and BS2, 620 is executed.

At 620, the configuration of the target platform 104 is identified. The target server 118 may be configured to identify the configuration of the target platform 104 (e.g., the operating system supported by the target hypervisor 114).

At 622, the block storages (e.g., the first block storage BS1 and the second block storage BS2) including the replicated first and second virtual disks VD1 and VD2 are attached to the second virtual machine VM2 on the target platform 104. The target server 118 may be configured to attach the block storages (for example, the first block storage BS1 and the second block storage BS2) including the replicated first and second virtual disks VD1 and VD2 to the second virtual machine VM2 of the target platform 104.

At 624, the attached block storages (e.g., the first block storage BS1 and the second block storage BS2) are updated with the configuration supported by the target platform 104. The target server 118 may be configured to update the attached block storages (i.e., raw data associated with the first and second virtual disks VD1 and VD2 stored in the first and second block storages BS21 and BS2) with the configuration supported by the target hypervisor 114 of the target platform 104.

At 626, the updated first and second block storages BS1 and BS2 may be detached from the second virtual machine VM2. The target server 118 may be configured to detach the updated first and second block storages BS1 and BS2 from the second virtual machine VM2.

Referring to FIG. 6C, at 628, the updated first and second block storages BS1 and BS2 may be attached to the third virtual machine VM3. The target server 118 may be configured to attach the updated first and second block storages BS1 and BS2 to the third virtual machine VM3.

At 630, platform specific configurations associated with the third virtual machine VM3 may be updated. The target server 118 may be configured to update the platform specific configurations associated with the third virtual machine VM3 hosting the first and second virtual disks VD1 and VD2 at the target platform 104. Examples of the platform specific configurations may include, but are not limited to, domain name system (DNS) entries and elastic load balancing technique (ELB) configurations. The platform specific configurations associated with the third virtual machine VM3 may be updated to replicate the configurations of the first virtual machine VM1 on the third virtual machine VM3. The target server 118 may be configured to update the platform specific configurations based on a user input received via the service application 112 operating in the second mode of operation at the target server 118.

At 632, the third virtual machine VM3 hosting the replicated first and second virtual disks VD1 and VD2 is booted at the third virtual machine VM3 of the target platform 104 using the target hypervisor 114. The target server 118 may be configured to boot the third virtual machine VM3 of the target platform 104 using the target hypervisor 114 to deploy the boot files and data files in the first and second virtual disks VD1 and VD2 associated with the workload to be replicated.

The disclosed embodiments encompass numerous advantages. Exemplary advantages of the disclosed methods include, but are not limited to, facilitating workload portability in the cloud environments. Also, the disclosed methods and systems eliminate the requirement of converting the workload to an open virtual format. Hence, disclosed methods and systems facilitate recovery or migration in cloud environments within a significantly reduced time duration. Therefore, a recovery time for resuming operations associated with the virtual machines remains minimal. Further, the disclosed systems and methods ensure recovery of the virtual machines in the event of infrastructure failure or service outage with minimal to no loss of data. Moreover, the disclosed systems and methods ensure that during migration, operations associated with the virtual machines resume at the earliest, for example, within 10 minutes. Further, the systems and methods disclosed herein perform an optimal replication of virtual machines as specific data is replicated only once. Hence, replicated data does not include any duplicate copies. Further, the virtual machines are copied at the block level by capturing snapshots of the workload associated therewith. Hence, there is no requirement to copy data on a per-file basis which significantly reduces the time to be spent on the replication of the virtual machines. Further, the disclosed methods and systems replicate only raw data associated with the virtual machines that do not include any configuration files associated with the source hypervisor 106. Hence, there is no requirement for any conversion or elimination of any pre-existing parameter or configuration in the snapshots to any universal form. Further, the source platform 102 does not require to shut down at any time during the migration event. Hence, the users of the source platform 102 may face less inconvenience during the migration event.

Certain embodiments of the disclosure may be found in the disclosed systems, methods, and non-transitory computer-readable medium, for facilitating workload probability. Exemplary aspects of the disclosure provide the methods and the systems for facilitating workload portability. The methods and systems include various operations performed by a source server 110 and/or a target server 118. In some embodiments, the methods and systems include various operations performed by a processor (for example, a processor 402). In an embodiment, the target server 118 is instantiated at the target platform 104. The target server 118 is configured to store, at the target platform 104, the snapshot of the workload executing at the source platform 102. The snapshot is captured at each defined time-interval and corresponds to an incremental change in the workload in raw state. The workload stored at the target platform 104 includes one or more boot files and one or more data files. The target server 118 is further configured to update, based on the trigger pertaining to workload portability of the workload, the one or more boot files and the one or more data files with configuration supported by the target platform 104. The target server 118 is further configured to execute the updated one or more boot files and the updated one or more data files at the target platform 104. The execution of the workload at the target platform 104 is identical to the execution thereof at the source platform 102.

In some embodiments, the source server 110 is instantiated at the source platform 102. The source server 110 is configured to capture the snapshot of the workload at each defined time-interval and communicate the captured snapshot to the target server 118 at the defined time-interval.

In some embodiments, the source server 110 is configured to encrypt the captured snapshot prior to the communication of the captured snapshot to the target server 118. The target server 118 is configured to decrypt the received snapshot prior to the storage at the target platform 104.

In some embodiments, the target server 118 is configured to execute the pull operation to retrieve the snapshot of the workload from the source platform 102 at each defined time-interval.

In some embodiments, the snapshot includes raw data associated with the boot file or the data file of the workload being executed on the first virtual machine VM1 hosted at the source platform 102.

In some embodiments, the update of the one or more boot files and the one or more data files is performed in an offline manner.

In some embodiments, the one or more boot files and the one or more data files are stored in one or more block storages (for example, the first block storage BS1 and the second block storage BS2) associated with the target platform 104. The target server 118 is configured to attach the one or more block storages (for example, the first block storage BS1 and the second block storage BS2) to the second virtual machine VM2 hosted at the target server 118 to enable the update of the one or more boot files and the one or more data files.

In some embodiments, the target server 118 stores the snapshot at each defined time-interval in the one or more block storages (for example, the first block storage BS1 and the second block storage BS2).

In some embodiments, the target server 118 stores the snapshot at each defined time-interval in one of the group consisting of one or more object storages, one or more file storages, and one or more snapshot storages associated with the target platform 104, and wherein in response to the trigger, the target server 118 is configured to move the one or more boot files and the one or more data files to one or more block storages (for example, the first block storage BS1 and the second block storage BS2) associated with the target platform 104.

In some embodiments, the one or more boot files are stored separately from the one or more data files.

In some embodiments, the one or more boot files are updated with one or more system files, one or more service files, one or more drivers, boot configuration, network configuration, or display configuration supported by the target platform 104 and the one or more data files are updated with the file system configuration and/or an operating system configuration supported by the target platform 104.

In some embodiments, the trigger pertaining to the workload portability of the workload is associated with one of the group consisting of the migration event and the recovery event associated with the workload.

In some embodiments, in order to execute the workload at the target platform 104, the target server 118 is configured to attach the updated one or more boot files and the updated one or more data files to the third virtual machine VM3 hosted at the target platform 104 and boot the third virtual machine VM3.

In some embodiments, the target server 118 is configured to replicate, on the third virtual machine VM3, security and access control configuration associated with the workload executing at the source platform 102.

In some embodiments, the target server 118 is configured to determine the authenticity of the snapshot upon reception at the target platform 104.

In some embodiments, the workload is one of a group consisting of operating systems, containers, one or more applications running on the operating systems, and data associated with the one or more applications.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for facilitating the portability of virtual machines in cloud environments. While various embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing the disclosure, without departing from the breadth or scope.

What is claimed is:

1. A system for facilitating workload portability, the system comprising:

a target server instantiated at a target platform, wherein the target server is configured to:

store, in one or more snapshot storages associated with the target platform, a snapshot of a workload associated with a virtual machine of a source platform, wherein the snapshot is captured at each defined time-interval and corresponds to an incremental change in the workload, the stored snapshot of the workload includes one or more boot files associated with the virtual machine of the source platform and one or more data files associated with the virtual machine of the source platform, and the target platform supports a configuration different from a configuration of the source platform;

move, based on a trigger associated with workload portability of the workload, the one or more boot files and the one or more data files from the one or more snapshot storages to one or more block storages associated with the target platform;

establish, based on the movement of the one or more boot files and the one or more data files, a connection between the one or more block storages and a first virtual machine of the target platform, wherein the first virtual machine of the target platform is compatible with the virtual machine of the source platform;

update, based on the establishment of the connection between the one or more block storages and the first virtual machine of the target platform, the one or more boot files and the one or more data files with the configuration supported by the target platform;

terminate, based on the update of the one or more boot files and the one or more data files, the connection between the one or more block storages and the first virtual machine of the target platform; and execute, based on a second virtual machine of the target platform, the updated one or more boot files and the updated one or more data files, wherein the second virtual machine of the target platform replicates the virtual machine of the source platform, and the execution of the workload at the target platform is identical to execution of the workload at the source platform.

2. The system of claim 1, further comprising a source server instantiated at the source platform, wherein the source server is configured to capture the snapshot of the workload and communicate the captured snapshot to the target server at the each defined time-interval.

3. The system of claim 2, wherein
the source server is further configured to encrypt the captured snapshot prior to the communication of the captured snapshot to the target server, and
the target server is further configured to decrypt the communicated snapshot prior to the storage at the target platform.

4. The system of claim 1, wherein the target server is further configured to execute a pull operation to retrieve the snapshot of the workload from the source platform at the each defined time-interval.

5. The system of claim 1, wherein the snapshot includes raw data associated with a boot file of the one or more boot files of the workload and raw data associated with a data file of the one or more data files of the workload.

6. The system of claim 1, wherein the update of the one or more boot files and the one or more data files is performed in an offline manner.

7. The system of claim 6, wherein the target server is further configured to:
store the snapshot at the each defined time-interval in one of one or more object storages associated with the target platform or one or more file storages associated with the target platform; and
move, based on the trigger, the one or more boot files and the one or more data files from the one of the one or more object storages or the one or more file storages to the one or more block storages.

8. The system of claim 1, wherein the one or more boot files are stored separately from the one or more data files.

9. The system of claim 1, wherein
the one or more boot files are updated with at least one of one or more system files, one or more service files, one or more drivers, boot configuration, network configuration, or display configuration supported by the target platform, and
the one or more data files are updated with at least one of a file system configuration or an operating system configuration supported by the target platform.

10. The system of claim 1, wherein the trigger is associated with at least one of a migration event associated with the workload or a recovery event associated with the workload.

11. The system of claim 1, wherein to execute the workload at the target platform, the target server is further configured to attach the updated one or more boot files and the updated one or more data files to the second virtual machine of the target platform and boot the second virtual machine.

12. The system of claim 11, wherein the target server is further configured to replicate, on the second virtual machine, security and access control configuration associated with the workload.

13. The system of claim 1, wherein the target server is further configured to determine authenticity of the snapshot based on reception of the snapshot at the target platform.

14. The system of claim 1, wherein the workload is at least one of operating systems, containers, one or more applications running on the at least one of operating systems, or data associated with the one or more applications.

15. A method for facilitating workload portability, the method comprising:
storing, by a target server instantiated at a target platform, a snapshot of a workload associated with a virtual machine of a source platform in one or more snapshot storages associated with the target platform, wherein
the snapshot is captured at each defined time-interval and corresponds to an incremental change in the workload, and
the stored snapshot of the workload includes one or more boot files associated with the virtual machine of the source platform and one or more data files associated with the virtual machine of the source platform, and
the target platform supports a configuration different from a configuration of the source platform;
moving, by the target server, the one or more boot files and the one or more data files from the one or more snapshot storages to one or more block storages associated with the target platform, wherein the movement of the one or more boot files and the one or more data files is based on a trigger associated with workload portability of the workload;
establishing, by the target server, a connection between the one or more block storages and a first virtual machine of the target platform, wherein
the establishment of the connection between the one or more block storages and the first virtual machine is based on the movement of the one or more boot files and the one or more data files, and
the first virtual machine of the target platform is compatible with the virtual machine of the source platform;
updating, by the target server, the one or more boot files and the one or more data files with the configuration supported by the target platform based on the establishment of the connection between the one or more block storages and the first virtual machine of the target platform;
terminating, by the target server, the connection between the one or more block storages and the first virtual machine of the target platform based on the update of the one or more boot files and the one or more data files; and
executing, by the target server, the updated one or more boot files and the updated one or more data files based on a second virtual machine of the target platform, wherein
the second virtual machine of the target platform replicates the virtual machine of the source platform, and
the execution of the workload at the target platform is identical to execution of the workload at the source platform.

16. A non-transitory computer-readable storage medium comprising instruction stored therein, which when executed by one or more processors, cause the one or more processors to perform operations comprising:
storing a snapshot of a workload associated with a virtual machine of a source platform in one or more snapshot storages associated with a target platform, wherein
the snapshot is captured at each defined time-interval and corresponds to an incremental change in the workload, the stored snapshot of the workload-stored at the target platform includes one or more boot files associated with the virtual machine of the source platform and one or more data files associated with the virtual machine of the source platform, and the target platform supports a configuration different from a configuration of the source platform:

moving, based on a trigger associated with workload portability of the workload, the one or more boot files and the one or more data files from the one or more snapshot storages to one or more block storages associated with the target platform;

establishing, based on the movement of the one or more boot files and the one or more data files, a connection between the one or more block storages and a first virtual machine of the target platform, wherein the first virtual machine of the target platform is compatible with the virtual machine of the source platform;

updating the one or more boot files and the one or more data files with the configuration supported by the target platform based on the establishment of the connection between the one or more block storages and the first virtual machine of the target platform;

terminating, based on the update of the one or more boot files and the one or more data files, the connection between the one or more block storages and the first virtual machine of the target platform; and executing, based on a second virtual machine of the target platform, the updated one or more boot files and the updated one or more data files, wherein the second virtual machine of the target platform replicates the virtual machine of the source platform, and the execution of the workload at the target platform is identical to execution of the workload at the source platform.

17. The system of claim 2, wherein the source server is further configured to:

determine, at the each defined time-interval, modified data in at least one of the one or more boot files or the one or more data files; and communicate, to the target server, a snapshot of the modified data as the snapshot of the workload.

18. The system of claim 2, wherein the source platform includes a source hypervisor that supports one or more snapshot-capturing techniques, and the source server is further configured to capture the snapshot of the workload based on the one or more snapshot-capturing techniques.

19. The system of claim 1, wherein the one or more boot files and the one or more data files are associated with an application, and the target server is further configured to recover, based on a failover event of the application, the application within a specific time associated with the update of the one or more boot files and the one or more data files.

20. The system of claim 1, wherein the source platform and the target platform correspond to different virtual environments.

* * * * *